United States Patent
Theimer et al.

[11] 3,886,290
[45] May 27, 1975

[54] ELECTRODE TYPE COOKING PACKAGE

[75] Inventors: Ernst Theodore Theimer, Rumson; Donald Joseph Roslonski, Bricktown, both of N.J.

[73] Assignee: National Electro-Cook Corporation, East Brunswick, N.J.

[22] Filed: Jan. 4, 1973

[21] Appl. No.: 320,877

[52] U.S. Cl. .................. 426/107; 99/358; 219/214; 219/386
[51] Int. Cl. ......................................... B65b 25/22
[58] Field of Search .......... 426/113, 114, 234, 244, 426/246, 523, 107; 99/358; 219/385–387, 214

[56] References Cited
UNITED STATES PATENTS

| | | | |
|---|---|---|---|
| 2,011,383 | 8/1935 | Taylor | 206/46 F |
| 2,107,931 | 2/1938 | Brown | 426/523 |
| 2,405,984 | 8/1946 | Sharpe | 99/358 |
| 2,474,390 | 6/1949 | Aff | 426/107 |
| 2,939,793 | 6/1960 | Richman | 426/107 |
| 3,062,663 | 11/1962 | Furgal et al. | 206/46 F UX |
| 3,117,511 | 1/1964 | Everett | 99/358 X |
| 3,245,338 | 4/1966 | Korr | 99/358 |
| 3,311,285 | 3/1967 | Korr | 99/358 |
| 3,442,433 | 5/1969 | Lombardi et al. | 426/112 X |
| 3,548,738 | 12/1970 | McDevitt | 99/358 |

OTHER PUBLICATIONS
Modern Packaging 4/57 pp. 94, 95.

*Primary Examiner*—Frank W. Lutter
*Assistant Examiner*—Steven L. Weinstein
*Attorney, Agent, or Firm*—Arthur L. Liberman, Esq.

[57] ABSTRACT

Described is a packaged food product including a container, shell or enclosure which exists in an "open" position prior to loading and "closed" position thereafter and which encloses food substances such that an essentially electrically non-conducting food component has in contact therewith on at least one of its surfaces or envelopes the major part of a relatively electrically conducting food component. The conducting food substance protrudes or extends longitudinally away from two axially polar parts or ends of the non-conducting food substance and, when the container, shell or enclosure is in a closed position both the non-conducting and conducting food substance are held in a fixed position as a result of the design of the internal surfaces of the ends of one or both portion(s) of the container, enclosure or shell. At the ends of the container, enclosure or shell, electrical conducting means such as metal foils are attached to and are in intimate contact with the internal surfaces of the axially polar ends of the container and are designed to make electrical contact with the terminals of an electrical energy source for a finite period of time when the container is in a closed position and while the non-conducting and conducting foods are held in the container. Apart from the electrical conducting means, the rest of the container is both (1) electrically non-conducting and (2) thermally non-conducting, so that when electrical energy is applied to the electrical conducting means when (a) the container, shell or enclosure is in a closed position and when (b) the conducting and non-conducting foods contained in the container, both these foods are heated; and immediately subsequent to the application of the electrical energy, the food remains in a heated state for a convenient time. When the container, shell or enclosure is in a closed position and the electrically conducting and non-conducting foods are properly positioned therein, the electrically conducting food is pressed tightly against the electrical conducting means located at each of the axially polar internal surfaces of the ends of the container in a form-fitting manner, due in part to the nature of the physical properties of the material of construction of the container, enclosure or shell.

8 Claims, 23 Drawing Figures

PATENTED MAY 27 1975

SHEET 1

3,886,290

PATENTED MAY 27 1975 SHEET 2 3,886,290

ELECTRODE TYPE COOKING PACKAGE

BACKGROUND OF THE INVENTION

This invention relates to a unit food package such as a unit sausage (e.g., frankfurter), pizza, hamburger, or cheeseburger package and more particularly to a unit moisture-containing compound food package in which an electrically conducting food such as a frankfurter, which is in intimate contact and within or upon a suitable non-electrically conductive food substance such as a bun, may be cooked and caused to remain conveniently hot and edible for a convenient period of time after cooking. This invention also relates to the container used for enclosing the electrically non-conducting food and electrically conducting food, the said container being an integral part of said compound food unit.

DESCRIPTION OF THE PRIOR ART

The cooking of an electrically conducting food substance by passing an electrical current therethrough, i.e., by means of electrical resistance cooking, is known, as shown by the following United States patents:

U.S. Pat. No. 3,651,752, incorporating by reference application for U.S. Pat. Ser. No. 837,645 filed June 30, 1969.
Inventor: Roslonski
discloses: a packaged food product such as a frankfurter having a wrapper. The wrapper ends have two separate conducting strips which contact two portions of the food substance for cooking same. The wrapper is sealed about the ends of the food substance allegedly to insure good electrical contact between the conducting strips and the food substance.

U.S. Pat. No. 2,939,793.
Inventor: Richman
discloses: a frankfurter package unit including a frankfurter axially confined in a wrapper, the frankfurter having its pulp portion exposed at both ends at right angles to its longitudinal axis within the wrapper, the wrapper consisting of sealed end portions formed of flexible metallic electrical conducting material secured at opposite end portions to a central non-conducting wrapper material, the trimmed ends of the frankfurter being in juxtaposition to the sealed metallic conductor ends of the wrapper whereby the frankfurter can be cooked without removing the wrapper, by insertion of the entire package intermediate to a pair of electrodes and applying electrical current through the electrodes in sufficient amount to heat the frankfurter without the electrodes perforating the wrapper.

U.S. Pat. No. 3,548,738.
Inventor: McDevitt
discloses: a hot dog vending machine including a cold food storage compartment, a pair of vertically spaced actuating bars and a composite hot dog — electrode cooking package stored within the food compartment with special emphasis on the nature of the package, which package includes a pair of spaced electrodes each of which is bonded to the hot dog and retained within a cylindrical cardboard container previously formed for operation in the machine and cooperating with the spaced actuating bars. The electrodes may be in the form of end caps which fit in intimate contact over the ends of the frankfurter and which do not puncture the frankfurter. See Column 3, lines 60–66.

One of the principal advantages of this type of electrical resistance cooking is the relatively short period of time required for conducting food substances to be effectively cooked thereby. Accordingly, electrical resistance cooking has been employed preferentially in food dispensing machines where speed of cooking is particularly desirable.

One of the most common conducting food substances cooked by electrical resistance cooking in dispensing machines is the frankfurter. Hitherto a frankfurter pierced at each end by an electrode was cooked by passing an electrical current between the electrodes. Usually, the frankfurter is disposed within a bun and the resulting sandwich enclosed by a wrapping having suitable openings for admitting the electrodes therein. The principal disadvantage of employing a package of this type is that the food substances within the package are exposed to the atmosphere and thus subject to contamination.

One solution to this problem is to enclose associated conducting and non-conducting food substances, i.e., a frankfurter and bun, in a wrapper having conducting portions which contact the conducting food substance so that electrical current may be passed through such substance without disturbing the integrity of the wrapper. A packaged food product of this type is disclosed in Richman U.S. Pat. No. 2,939,793. However, a new problem is posed by this packaging technique, namely, that of insuring that good electrical contact is maintained between the conducting portions of the wrapper and the conducting food substance. One solution to this problem, offered in the aforementioned Richman patent, is to lay bare as by peeling, the ends of the conducting food substance to expose the inner portions thereof. Such exposed inner portions are then placed in intimate contact with the conducting portions of the wrapper.

However, this solution is essentially inoperable using the method described in Richman, and further, using the technique described in Roslonski, or that shown in FIG. 9 of McDevitt since the contact area (in each of the disclosures) between electrode and frankfurter is too small to permit rapid cooking without charring of the meat. In addition, baring the ends of the frankfurter as done by Richman, is a costly, unhygienic and superfluous operation. Further, encasing each end of both the conducting food and non-conducting food (which encloses the conducting food) as described in Roslonski leads to inefficiency, and inconvenience to the consumer of the product. A further disadvantage when using the Roslonski product is that some of the foil may adhere to the food product when the package is opened for eating. The electrode caps of McDevitt (FIG. 9) must be removed prior to removal of the food product from the McDevitt vending machine. This aspect of McDevitt leads to much inconvenience on the part of both the vendor and the vendee of the McDevitt food unit.

SUMMARY OF THE INVENTION

The present invention offers a convenient, economically attractive solution to the above-mentioned problems. Basically, the food package of our invention comprises a relatively electrically non-conducting food substance, a relatively electrically conducting food substance in intimate contact with (i.e., either within or upon) the non-conducting substance and having two portions extending outwardly therefrom, and an enclosure, container or shell enclosing the non-conducting and conducting food substances. The enclosure which is also part of our invention consists of an electrically and thermally non-conducting shell the internal ends of which are form-fitting to the protruding ends of the electrically conducting food substance. In addition, the said container, enclosure or shell may also be form-fitting to a minor part of the non-conducting food substance. A significant part of the form-fitting portion of the said shell is lined with an electrical conducting means adhering thereto such as a conducting film (e.g., by means of aluminum metallizing or foil) which preferably extends to the exterior of the shell or is attached to a second electrical conducting foil section or wire which extends to the exterior of the container at each end so as to effect electrical contact with the electrodes of a cooking device without requiring the physical opening of the container or the physical penetration of the container during cooking. Metallizing can be effected according to any of the processes set forth in U.S. Pat. Nos. 3,533,828; 3,549,505; or 3,669,714.

A container as described above for the purposes of our invention is fabricated of an electrically and thermally insulating material such as cardboard, or preferably a rigid polymer, such as polyvinyl chloride or polyvinyl acetate-polyvinyl chloride copolymer, or an aerated polymer such as polystrene or polyurethane in order to provide a light, disposable package suitable for use in vending machines and for large scale food vending operations where it is desirable to cook rapidly large quantities of units and keep them reasonably warm for relatively long periods of time subsequent to cooking. Examples of such vending machines are set forth in U.S. Pat. No. 3,651,752 issued on Mar. 28, 1972. In particular, such a container shell or enclosure would be operable whereby when an electrical current in the range of 0.3 to 1.5 amperes and from 12 up to 220 volts is applied for a period to time from 3 up to 20 seconds to an electrical conducting means the food product within the container (e.g., a frankfurter having a diameter of ⅝-¾ inch and being 4.5-6 inches in length) is cooked internally, so that the average temperature of the electrically conducting food (such as a frankfurter) after cooking is initially in the range from 150°F to 212°F and the average temperature range of the accompanying low conducting food (e.g., a frankfurter roll, hamburger bun or pizza dough) is after cooking initially in the range of 120°F to 150°F; and after about 30 minutes after cooking the average temperature of the high conducting food is in the range of from 100°F to 150°F and the average temperature of the low conducting food is from 90°F to 130°F. The container described herein accomplishes this and, in addition, obviates the need to package the food substances in film wrapping and precludes the need to expose fresh portions of the electrically conducting food (as, for example, by cutting or peeling the ends of a frankfurter) thus simplifying the packaging and improving the accessibility of the food to the consumer.

When the container is fabricated from a yielding material such as, preferably styrofoam (aerated polystyrene) or rigid polyvinyl chloride-polyvinyl acetate copolymer, the act of closing the container onto the food material in the initial packaging operation insures the necessary intimate contact between the internal surfaces of the axially polar ends of the container and the surface of the electrically conducting food substance (e.g., the frankfurter) at the ends thereof without danger of damage to the food. The rest of the container need not perform any function other than to (1) loosely enclose the food and (2) act as a thermal insulator subsequent to the cooking operation keeping the food in a conveniently warm state until it is eaten. The axially polar internal ends of the container of our invention are lined with an electrically conducting means, preferably an electrically conducting film such as a metallized aluminum surface or foil at least 0.2 mils in thickness ($2\times10^{-4}$ inches) which 1. Makes contact with the electrically conducting food substances;
2. Extends or has an electrical connection to the outside of the container, shell or enclosure; and
3. Makes contact during cooking with electrodes which are in turn in contact with an electrical energy source.

The electrical conducting means is pinned to the internal ends in a form-fitting manner as by crimping at the foil edges. In this manner a relatively large area of contact between the electrically conducting food and electrodes is provided without the need for an operation which involves physical intrusion into the closed container at any time subsequent to packaging and prior to opening the package to eat the cooked food. This obviously insures sanitary handling and simplifies the construction of the cooking device. The relatively large area of contact is essential to the success of rapid and effective cooking. The ratio of the contacted surface area of high conducting food portion to non-contacted surface area of high conducting food portion is preferably from about 1:8 up to 1:4. The term "contacted" is intended to mean area of electrically high conducting food contacted by the electrical conducting means. Too small a contact area slows down the rate of cooking, leading to a heating time inconveniently long for the operation of our invention. Too high a contact area, leads to a charring of the food.

While a major use of the special package is for cooked frankfurters, other foods may be cooked with equal effectiveness in other packages using the same principles. These include: hamburgers, cheeseburgers, sausages other than frankfurters, pizza, kielbasa, blinzes, knishes, kishka, "egg rolls," cold cuts, cold cut-cheese combinations, and cold cut-chopped liver combinations.

When the conducting lining extends to contact a limited portion of the non-conducting food substance, i.e., frankfurter roll, or a hamburger bun or pizza dough, the roll becomes warm while the meat or pizza filling or the like is cooked more rapidly than otherwise, thus improving the palatibility of the unit and permitting a longer period of time between cooking and consumption. Otherwise, heating of the non-conducting food is dependent upon heat conduction into it by means of the mass transfer of hot water vapor diffusing from the conducting food into the non-conducting food as the conducting food is heated. The operable and workable thickness range of the walls of the enclosure, shell or container of our invention is from 0.01 inches up to 1 inch with 3/32-¼ inches preferred in the case of using a foamed polymer such as styrofoam and from 0.01 up to 0.1 inches preferred in the case of using a rigid polymer such as a polyvinyl acetate-polyvinyl chloride copolymer, for ease in handling, and for optimum thermal performance. The thermal conductivity of the materials of construction of the container, shell or enclosure of our invention should be less than 1.50 BTU/hour-sq.ft.-(°F/inch). A practical thermal conductivity range when using a foamed polymer is from 0.15 up to 0.50 BTU/hour-sq.ft.-(°F/inch). The more preferable range of thermal conductivity of the foamed polymer-type materials of construction of the shell, enclosure or container of our invention is from 0.20 – 0.30 BTU/hour-sq.ft.-(°F/inch) at a mean temperature of between 60°F and 100°F. Thus, for example, a convenient and workable polystyrene foam for use as a material of construction in our invention may have, at a mean temperature of 75°F the following thermal conductivity coefficients:

| Density | K(BTU/hour-ft$^2$-(°F/inch) |
|---|---|
| 1 lb/ft$^3$ | 0.26 |
| 1.5 lb/ft$^3$ | 0.25 |
| 2 lb/ft$^3$ | 0.24 |

A practical thermal conductivity range when using a thin wall (0.01–0.1 inch thickness) rigid polymer such as a polyvinyl chloride-polyvinyl acetate copolymer is from 1.0 up to 1.4 BTU/hour-sq.ft.-(°F/inch).

The container of our invention may be produced by means of vacuum forming or thermo-forming or by means of molding. Thus, for example, the thermo-formed container, shell or enclosure may be produced using rigid polymer or polymeric foam planar sheets of appropriate thickness wherein there is attached to said sheets metal foil strips in such a way that an excess of foil beyond the planar shape of the plastic is present, permitting the foil to follow the contours of the shaped plastic without tearing. In another example, the metal foil is applied to the already shaped plastic and pinned thereto as by crimping at the foil edges.

With the foregoing in mind, it is a primary object of the present invention to provide an improved packaged food product, an integral part of which is an improved container or enclosure or shell for holding a packaged food prior to, during and subsequent to electrical resistance cooking and holding a packaged food conveniently in a heated state subsequent to electrical resistance cooking and just prior to consuming.

It is also an object of this invention to provide a packaged food product in which an electrically high conducting food substance is disposed in intimate contact with an electrically low conducting food, with the high conducting food having two axially polar high conducting food portions having external surfaces through which an electrical current can be easily conducted and which extend outwardly beyond the electrically low conducting food, and an enclosure of shell or container for enclosing the food during and subsequent to the electrical resistance cooking of same which is designed to:

1. Be thermally and electrically insulating;
2. Totally envelope the electrically low conducting food;
3. Have an internal surface fixedly holding the food over a significant portion of the surface of the food;
4. Have internal axially polar surfaces which are coextensive with the external surfaces of the axially polar high conducting food ends; and
5. Have fixedly and intimately attached or adhered to the internal axially polar surfaces of the container, electrical conducting means (such as aluminum metalizing or aluminum foil) which will be in direct intimate electrical contact with the end surface portions of the electrically high conducting food and which extend outwardly beyond each of the axially polar ends of the container or shell or enclosure when it is in a closed position, which electrical conducting means are designed to make electrical contact with a source of electrical energy.

It is a further object of this invention to provide a container or shell or enclosure designed for enveloping an electrically low conducting food which is in contact with electrically high conducting food which container or shell or enclosure is so designed that it is both thermally and electrically insulating and the container or enclosure or shell includes as integral parts thereof at least two separate electrical conducting means at each of the axially polar ends thereof passing from the outside of the container or shell or enclosure through its walls and into said container or shell or enclosure, each of which means is caused by the container or enclosure or shell itself to be in intimate contact with the axially polar ends of the electrically conducting food intended to be cooked during the electrical resistance cooking operation.

It is a further object of our invention to provide a packaged food product (including an electrically conducting food substance in contact with an electrically non-conducting food substance) which food product is enveloped in an enclosure, shell or container specifically designed for maximum convenience in catering by (i) facilitating the passage of an electrical current through the electrically conducting food substance for electrical resistance cooking of same, and (ii) simultaneously causing same to remain in a heated state for an extended period of time subsequent to the passage of said electrical current without exposing the said food substance to possible sources of contamination.

These and other objects of the invention will become apparent upon a consideration of the detailed description of preferred embodiments thereof given in connection with the following drawings.

Although specific terms are used in the following description for the sake of clarity, these terms are terms intended to refer only to the particular structure of our invention selected for illustrations on the drawings and are not intended to define or limit the scope of our invention.

DESCRIPTION OF THE PREFERRED EMBODIMENT

Figure 1:
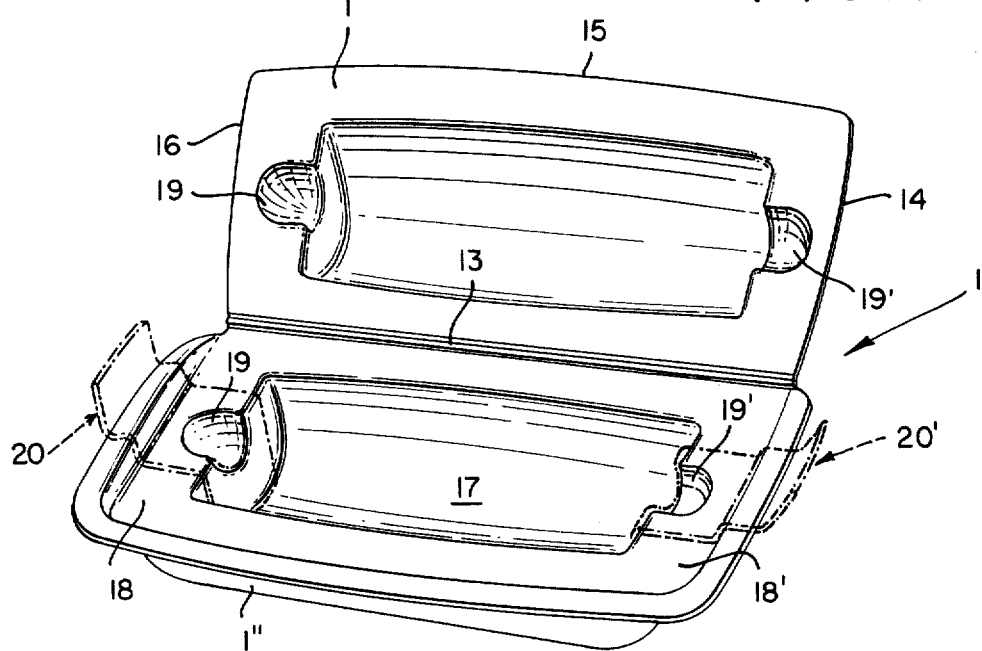
FIG. 1 is a front perspective view of that aspect of this invention which constitutes the enclosure portion of the packaged food product, showing in an open position a hollow thermally insulating container or shell or enclosure having a trough therein for holding the electrically low conducting food, and having an internal surface shaped to fixedly hold the ends of the food product when the container or shell or enclosure is in a closed position, prior to, during and subsequent to the electrical resistance cooking operation.
Figure 2:
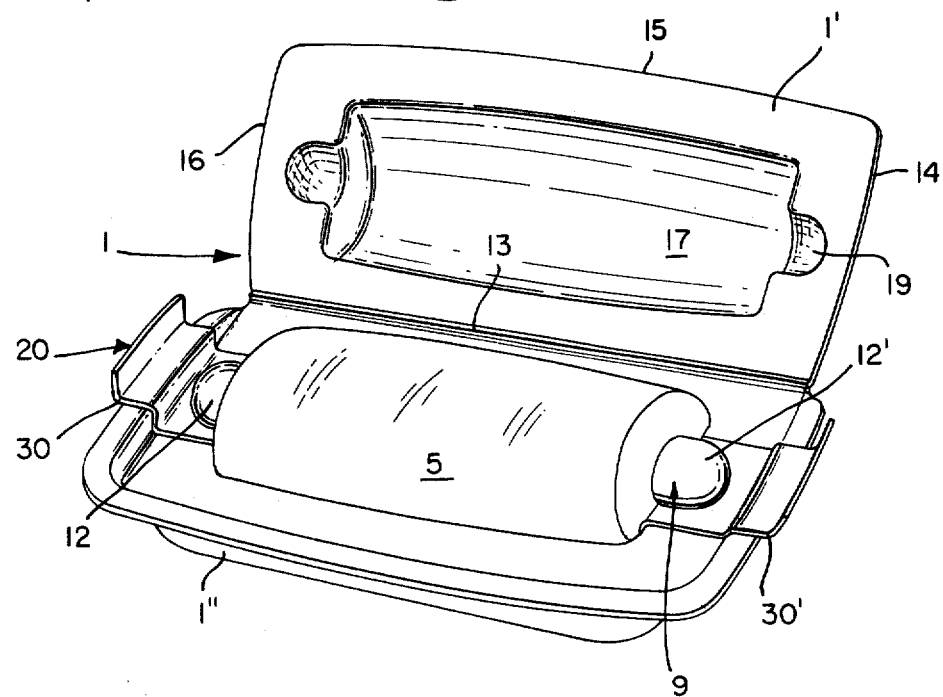
FIG. 2 is a front perspective view of the invention showing the packaged food product with the enclosure therefor, in an open position, wherein the enclosure is holding an electrically low conducting food (in this case a hot dog bun) which is enveloping an electrically high conducting food (in this case a hot dog).
Figure 3:
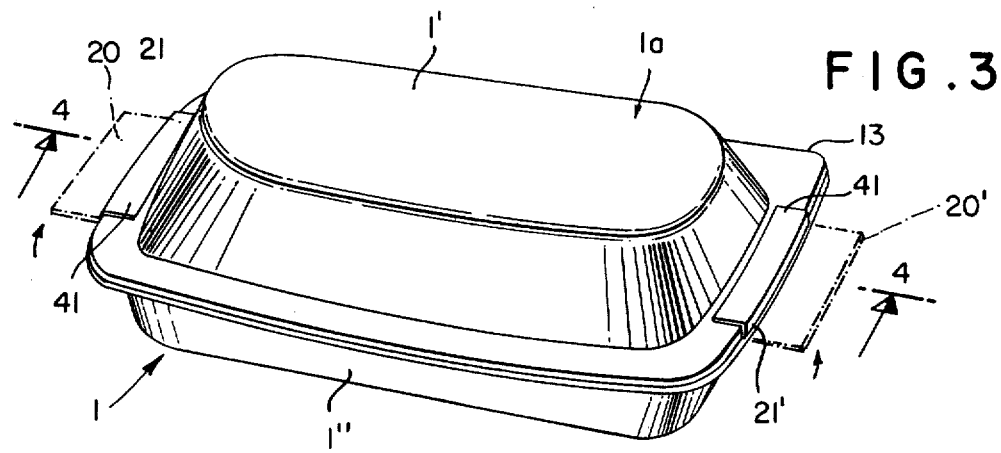
FIG. 3 is a front perspective view of the invention showing the packaged food product consisting of the electrically low conducting food enveloping the electrically high conducting food totally enclosed within a hollow thermally and electrically insulating container with electrical conducting means (which means are caused by the design of the container or shell or enclosure to be in intimate contact with the electrically high conducting food) connected to a source of electrical energy, during the cooking operation (not shown).
Figure 4:
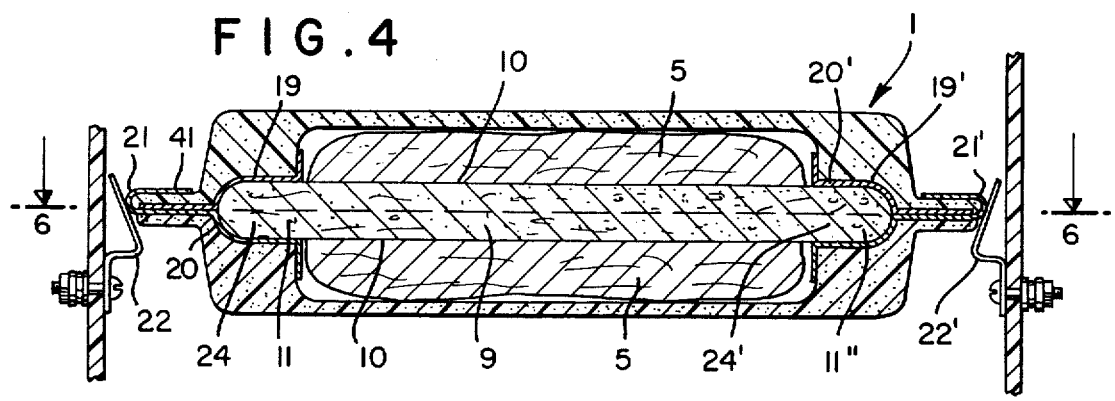
FIG. 4 is a longitudinal cross-sectional view taken along line 4—4 of FIG. 3 showing the electrically low conducting food enveloping the electrically high conducting food enclosed within the container, shell or enclosure (which container, shell or enclosure is in a closed position) and the electrically high conducting food is being cooked using the electrical conducting means (e.g., aluminum foil) which extend outwardly from the container or shell or enclosure and which are attached to the terminals of an electrical energy source.
Figure 5:
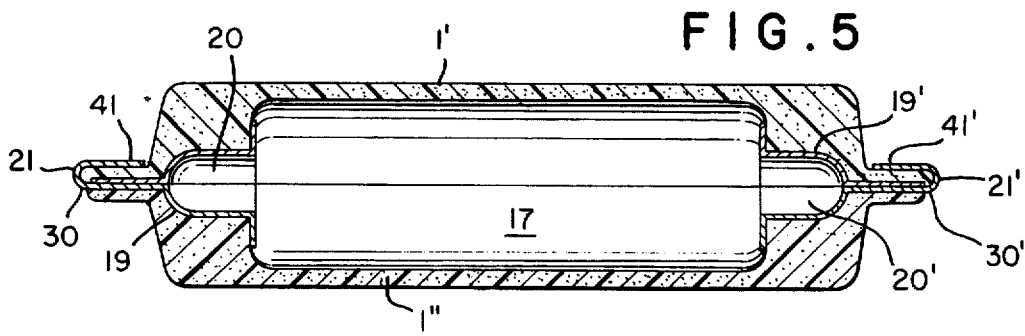
FIG. 5 is a substantially similar view as shown in FIG. 4 wherein the enclosure or shell or container, the purpose of which is to envelope the low conducting food, has no food within it.
Figure 6:
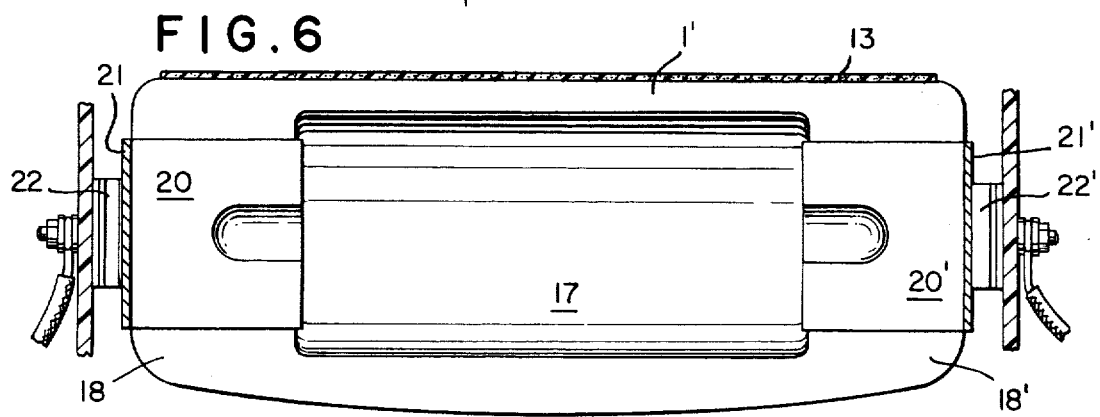
FIG. 6 is a longitudinal cross-sectional view taken along line 6—6 of FIG. 4 wherein the enclosure or shell or container does not contain food but where the electrical conducting means are still connected to the terminals of an electrical energy source.
Figure 7:
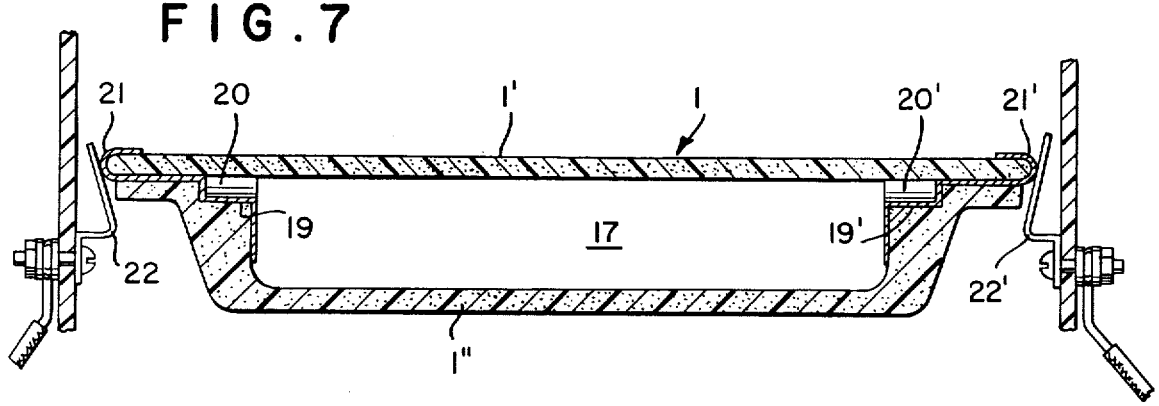
FIG. 7 shows a longitudinal cross-sectional view of an empty container or shell or enclosure, the purpose of which is to envelope prior to, during and subsequent to electrical resistance cooking, an electrically low conducting food which has only one of its surfaces in intimate contact with an electrically high conducting food (such as in the case of a pizza slice or an open face roast beef sandwich).
Figure 8:
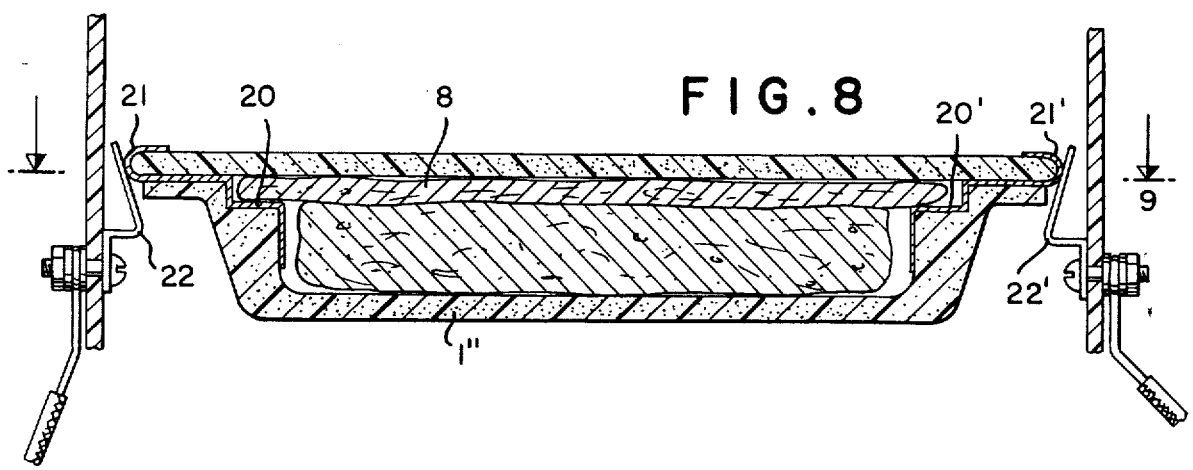
FIG. 8 is a longitudinal cross-sectional view of the packaged food product comprising our invention wherein the electrically low conducting food has only one of its surfaces in intimate electrical contact with the electrically high conducting food (as is the case when cooking pizza or an open face hamburger or cheeseburger) and the electrical conducting means (such as aluminum metallizing or aluminum foil) adhering to the internal surfaces of the axially polar ends of the container or shell or enclosure and caused as a result of the container or shell or enclosure design to be in intimate contact with the end portions of the electrically high conducting food surfaces, is in contact with an electrical energy source during the cooking operation.
Figure 9:
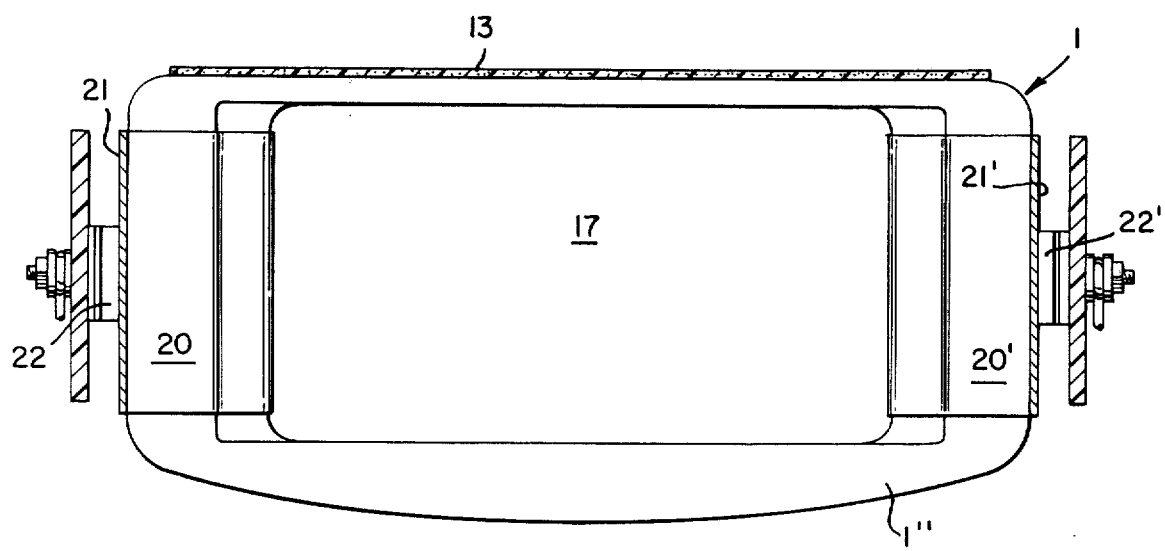
FIG. 9 represents a longitudinal cross-sectional view taken along line 9—9 of FIG. 8 wherein the enclosure, shell or container for the electrically low conducting food has no food therein and wherein the internal design of the container is specifically shaped for an electrical low conducting food having only one of its surfaces in contact with the electrically high conducting food, e.g. in the case of pizza or an open face cold cut sandwich.
Figure 10:
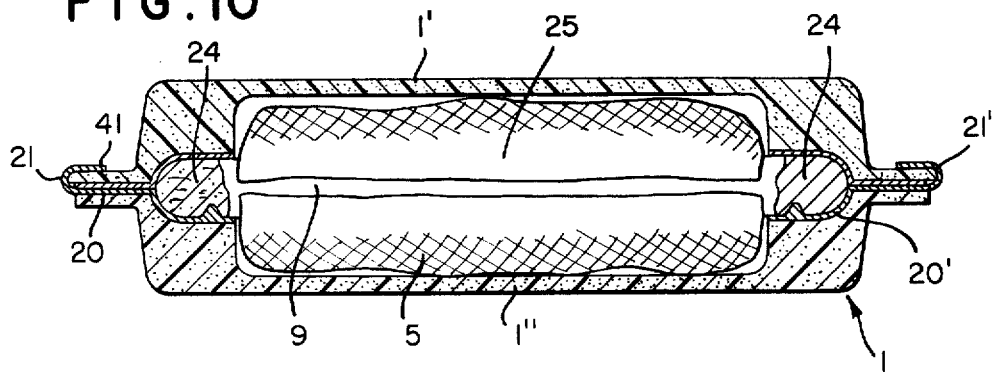
FIG. 10 is a longitudinal cross-sectional view of a modified enclosure, shell or container wherein additional electrical conducting means are located on portions of the electrical conducting means (e.g. aluminum foil) which are adhering to the internal surfaces of the axially polar ends of the container, which additional conducting means (e.g., blunt, rigid, hollow sections having a height of, for example, 0.3–0.4 inches) protrude from the surfaces of the original electrical conducting means portions which portions are intended to be in contact with the surfaces of the axially polar end portions of the electrically high conducting food.
Figure 11:
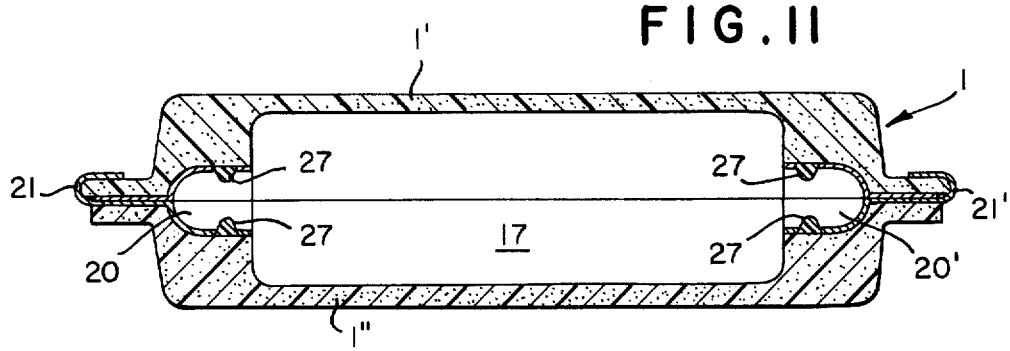
FIG. 11 is a cross-sectional view of an enclosure or shell or container for the electrically low conducting food which does not contain the electrically low conducting food and wherein protruding from the surfaces of those portions of the electrical conducting means (e.g., [such foil) intended to section ] in intimate contact with the surfaces of the end portions of the electrically high conducting food, are non-electrically conductive protrusions (e.g., blunt, firm sections having a height of approximately 0.3 to 0.4 inches, fabricated from a plastic material such as rigid thermoset polystyrene or polyurethane) designed to firmly keep in place the electrical conducting food during the electrical resistance cooking operation.
Figure 12:
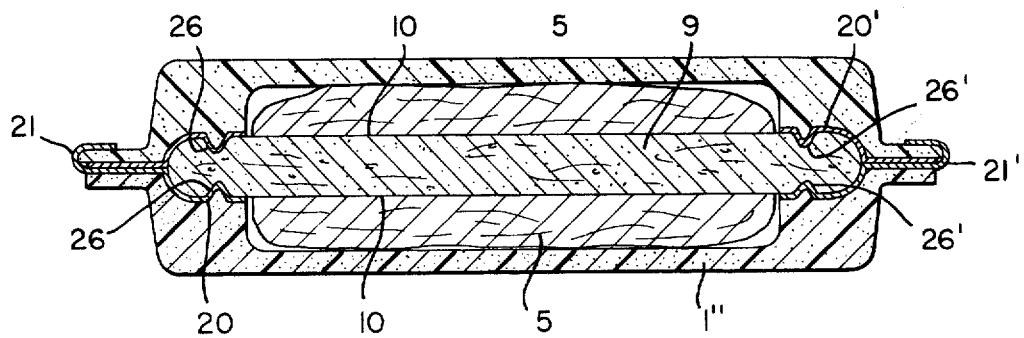
FIG. 12 is a longitudinal cross-sectional view showing the enclosure or shell or container of FIG. 10 containing the frankfurter enclosed within a frankfurter bun.
Figure 13:
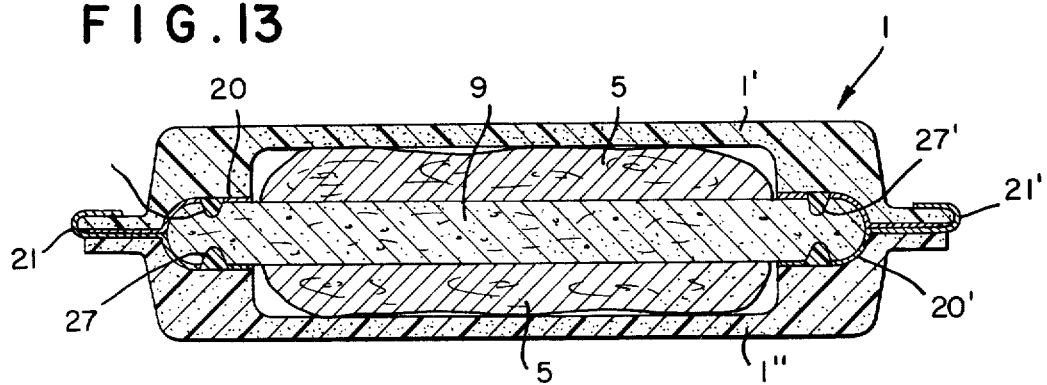
FIG. 13 shows a longitudinal cross-sectional view of a packaged food product the enclosure, shell or container for which is similar to the container illustrated in FIG. 11, wherein contained within the enclosure, shell or container is a frankfurter enclosed within a frankfurter bun.

The containerized bare food product of our invention is specifically illustrated in the drawings as comprising, firstly, an electrically low conducting food such as a frankfurter bun 5 or pizza dough; and an electrically high conducting food such as a frankfurter 9 disposed in proximate contact at 10 with the low conducting food, said high conducting food 9 (having an electrical resistivity of from 1 to 10 ohm inches over a temperature range of from 30°F up to 250°F) having two axially polar high conducting food portions 11 and 11' having external surfaces 12 and 12' through which an electric current can pass without undergoing a high voltage drop and extending outwardly beyond the low conducting food in the regions 11 and 11'. Enclosing the low conducting food is a hollow thermally and electrically insulating substantially moisture impervious enclosure or shell or container 1 (fabricated from, for example, styrofoam having a thickness of from 3/32 inch up to 1 inch and a thermal conductivity range over a mean temperature of from 60°F up to 100°F or from 0.2 up to 0.3 BTU/hour-sq.ft. - (°F/inch) the enclosure or shell or container being capable of existing in a closed position shown in FIG. 3 and in an open position shown in FIGS. 1 and 2. The outer surfaces of the container are so designed as to render said container conveniently adaptable for use in conjunction with an electrical resistance cooking apparatus such as an automatic vending machine as described in U.S. Pat. Nos. 3,548,738 and 3,651,752. The said container or shell or enclosure is constructed of two sections 1' and 1" having substantially conterminous edges with section 1' articulating section 1". In fact, section 1' may be so designed as to be hinged at 13 with section 1" and/or may interlock at 14, 15 and 16 with section 1". At least one of section 1' or 1" has an internal surface 17 designed to fixedly hold the bare food product 5 and 9 intimately contacting a substantial portion of the surface of the bare food at 12 and 12' when the container is in a closed position shown by FIG. 3. At least one of the container section 1' or 1" has axially polar ends 18 and 18' which have internal axially polar surfaces 19 and 19' which are co-extensive with the external surfaces 12 and 12' of the axially polar high conducting food portions 11 and 11'. Electrical conducting means such as metal foil having a thickness of at least a 0.2 mil 20 and 20' extend outwardly from container 1 at 30 and 30'. The electrical conducting means have electrical conducting ends 21 and 21' external to the enclosure which ends are designed to make electrical contact with the terminals 22 and 22' of an electrical energy source when the container is in a closed position as illustrated by FIG. 3. When ready for use in conjunction with an electrical resistance cooking apparatus, the portions of the electrical conducting means external to the walls of the container or shell or enclosure are preferably bent back substantially adjacent to said surfaces of said container or shell or enclosure walls, at 41 and 41', thus enabling effective low-resistance electrical contact to be maintained between the terminals 22 and 22' and the ends 21 and 21'. Portions of the electrical conducting means, 20 and 20' which are on the internal surfaces of the axially polar end portions 18 and 18' of the container or shell or enclosure are in intimate electrical contact with the external surfaces 12 and 12' of the two axially polar high conducting food portions 11 and 11' when the container is in a closed position as illustrated in FIG. 3. The electrically high conducting food such as a frankfurter may be disposed substantially within the low conducting food as illustrated in FIGS. 4, 12 and 13. Alternatively, the electrically high conducting food may be disposed in contact with but one surface of the low conducting food as in the case of FIG. 8. The edges of the enclosure or shell or container are substantially conterminous and may be interrupted at the proximate regions 11 and 11' of the axially polar high conducting food, such that discrete minute container openings exist at these proximate regions. The preferred ratio of the surface area of contacted high conducting food portion 24 and 24' to surface area of non-contacted high conducting food portion 25 is from 1:8 up to 1:4. The electrically high conducting food 9 may also be thermally high conducting.

Figure 14:
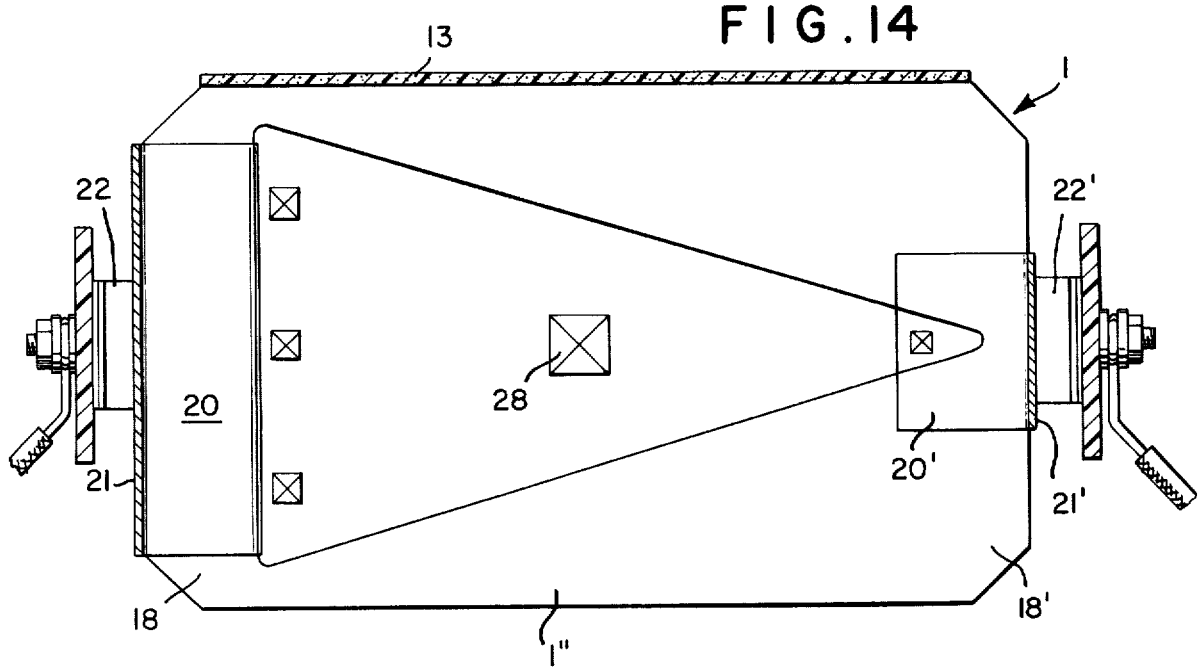
FIG. 14 is a half plan view showing a pizza enclosure, shell or container for use as part of the packaged food product in accordance with the principle of our invention. It does not contain food and is specifically designed to fixedly hold during electrical resistance cooking a pizza slice and cause said pizza slice to remain in a heated state until removal thereof from the container, shell or enclosure.
Figure 15:
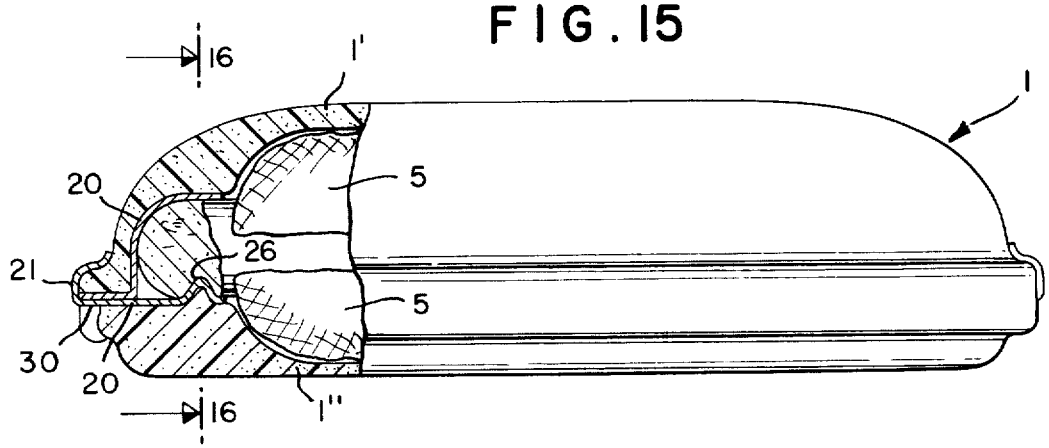
FIG. 15 is a side view of a partially cut-away packaged food product comprising out invention wherein the container, shell or enclosure thereof is produced by thermoforming and wherein the end portions of one of the internal surfaces of the container, shell or enclosure thereof is modified in that small polymeric protrusions having a height of between 0.3 up to 0.5 inches exist on these portions of internal surfaces so that portions of the electrically conducting means, e.g., aluminum metallizing or aluminum foil bonded to said surfaces, will protrude in the same manner as said polymeric protrusions, thus causing the same effects as indicated in the brief description of FIG. 10 supra.
Figure 16:
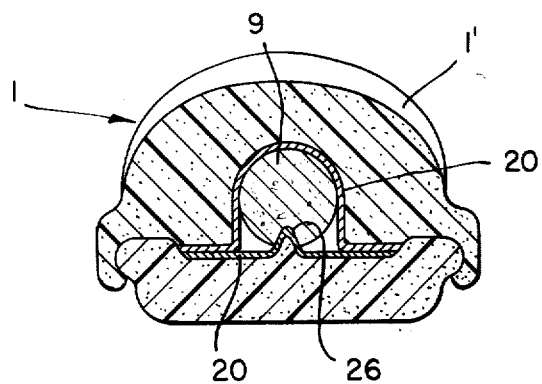
FIG. 16 is a cross-sectional view taken along line 16—16 of FIG. 15.
Figure 17:
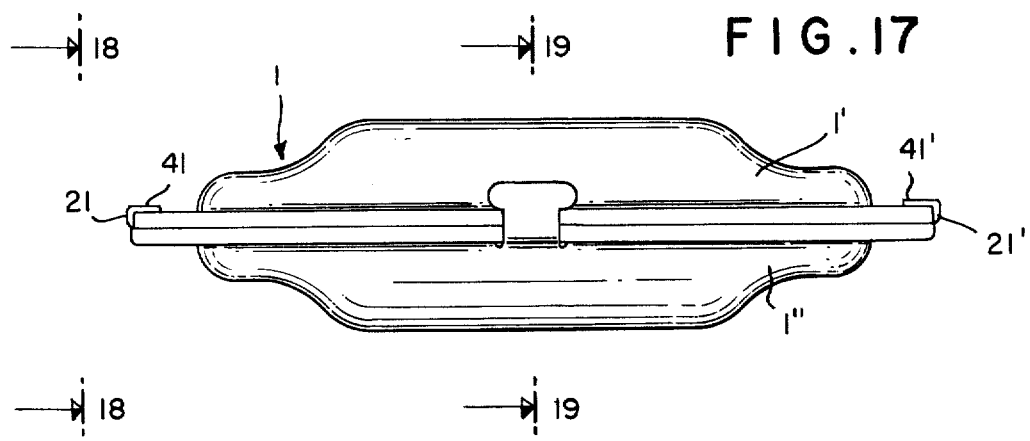
FIG. 17 shows a different container, shell or enclosure produced by means of thermoforming or vacuumforming for the packaged food product comprising our invention including locking means for holding together for the upper and lower sections of the container.
Figure 18:
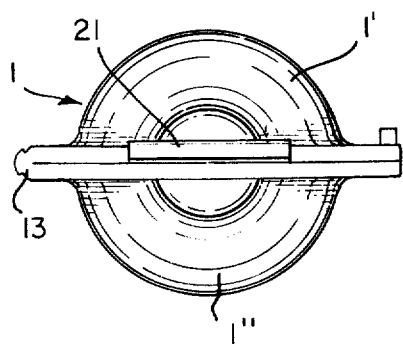
FIG. 18 is a side view taken along line 18—18 of FIG. 17.
Figure 19:
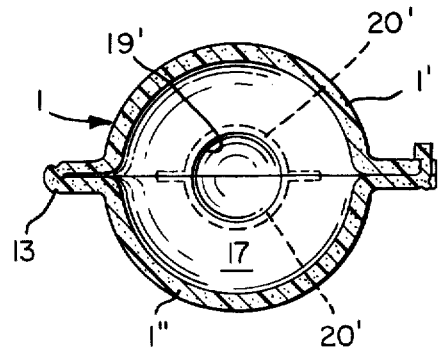
FIG. 19 represents a cross-sectional view taken along line 19—19 of FIG. 17.

In another embodiment of our invention, attached to and making contact with the portion of the electrical conducting means which is in contact with the electrical conducting food ends at surfaces 12 and 12', and extending outwardly from the electrically conducting means such as a foil section, are protruding electrical conducting or electrical non-conducting means; 26 and 26' in the case of protruding electrical conducting means and 27 and 27' in the case of protruding electrical non-conducting means. The purpose of protrusions 26 and 26' is two-fold: to provide greater surface area such that a higher amount of electrical energy per unit time is imparted (during the cooking operation) to the electrically conducting food and, secondly, to more firmly hold in place the electrically conducting food during cooking. Protrusions 27 and 27' which are electrically non-conducting merely serve to more firmly hold in place the electrically conducting food during cooking. Other protrusions such as protrusion 28 in FIG. 14, are parts of the internal surface of container 1 and serve to more firmly hold the electrically conducting and electrically non-conducting food during cooking. The protrusions are blunt so that the food will not be punctured or pierced but merely depressed at the region of the protrusion, to a depth of from 0.3 up to 0.4 inches.

Figure 22:
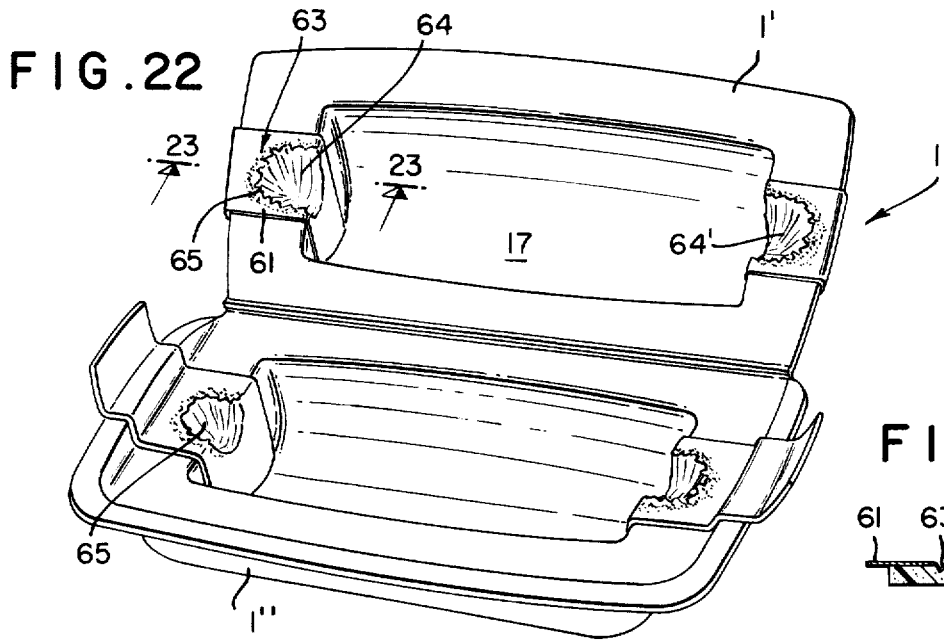
FIG. 22 represents a front perspective view of a container of our invention in an open position wherein metal foil electrical conducting means is applied to each of the axially polar ends of both articulating sections of the container and pinned thereto by crimping the edges of the foil. Foil protrusions are created on the internal end surfaces of both container sections when the foil is squeezed into the cavities at either end of each section.
Figure 23:
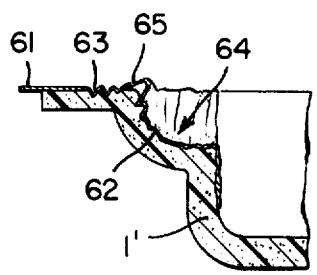
FIG. 23 represents a partial cross-sectional view taken along line 23—23 of FIG. 22.
Figure 20:
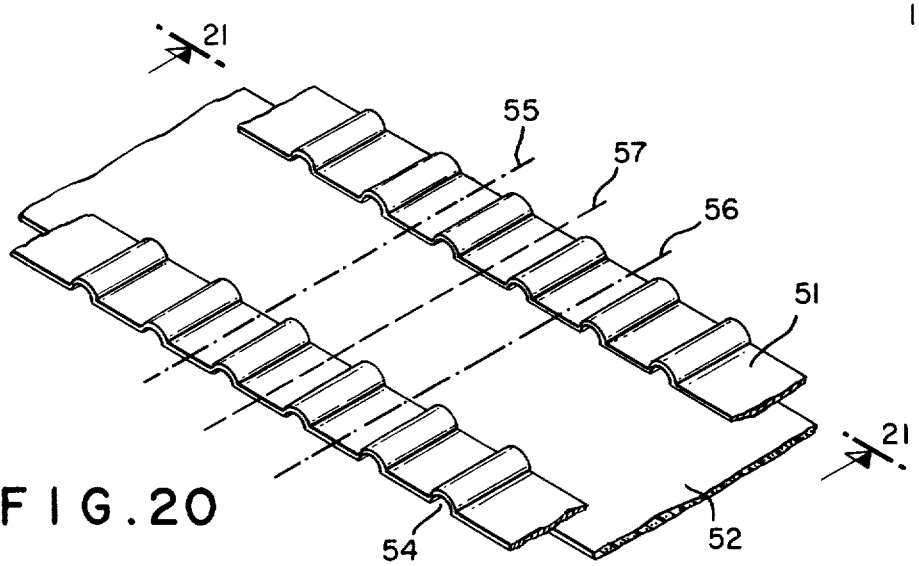
FIG. 20 represents a front perspective view of an uncut polymer sheet having adhered thereto metal foil strips, prior to thermoforming, for the purpose of producing the thermoformed or vacuum-formed container, shell or enclosure of FIG. 17.
Figure 21:
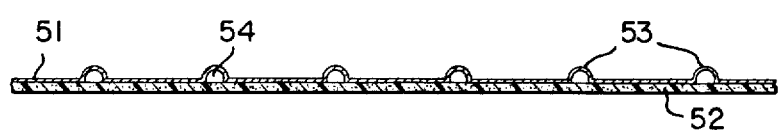
FIG. 21 represents a schematic cross-sectional view taken along line 21—21 of FIG. 20.

The container itself may be produced by molding or by thermoforming. As illustrated in FIG. 20 the electrically conducting foil 51 may be attached to flat polymeric sheet 52 in strips 51 prior to thermoforming in such a way that an excess of foil beyond the planar shape of the plastic sheet at 53 is present permitting the foil to follow the contours of the shaped plastic at regions 54 without tearing. After deep drawing the plastic sheet, the container forms are cut along lines 55 and 56 and folded along line 57. As illustrated in FIGS. 22 and 23, the metal foil 61 may also be applied to the already-shaped plastic 62 and pinned thereto as by crimping the edges at 63. When the foil is squeezed into the form fitting cavities 64 and 64' of the axially polar container ends (which are designed to hold the electrically conducting food) the foil bulges away from said surface at 65 thus effecting a protrusion, the advantages of which are twofold:
  i. To provide greater surface area such that a higher amount of electrical energy per unit time is imparted during the cooking operation to the electrically conducting food;
  ii. To more firmly hold in place the electrically conducting food during cooking.

The surfaces of each of cavities 64 and 64' may be smooth or they may be rough or they may each have one or several discrete nodules. The advantages of having multi-nodular cavity surfaces in cavities 64 and 64' are threefold:
  i. To provide greater ease and efficiency in manufacturing the enclosure, particularly where a metalized surface is desired;
  ii. To provide greater surface area of electrical contact between the electrical conducting means and the electrically high conducting food, such that a higher amount of electrical energy per unit time is imparted during the cooking operation to the electrically high conducting food; and
  iii. To more firmly hold in place the electrically high conducting food during cooking.

What is claimed is:

1. A single packaged unit of food for cooking the food therein consisting essentially of: (a) A solid electrically low conducting food; (b) A single solid electrically high conducting food unit disposed in fixed substantially surface-to-surface contact with and disposed substantially within said low conducting food; said high conducting food having two axially polar high conducting food portions having external surfaces and extending outwardly beyond said low conducting food; (c) a hollow thermally insulating substantially moisture-impervious container containing said unit of food and being capable of fixedly holding in position and maintaining the original geometry of said unit of food; said container comprising two sections hinged together and having substantially conterminous edges, a first section and a second section articulating said first section, said first section and said second section having mutually substantially continuous co-extensive edges, at least one of said sections having an internal surface designed to fixedly hold said unit of food over a substantial portion of the surfaces of said food when the container is in a closed position; at least one of said container sections having axially polar ends, said axially polar ends having internal axially polar surfaces which are co-extensive with the external surfaces of said axially polar high conducting food portions; at least two separate electrically conducting foil means extending outwardly from said container, each of said electrically conducting foil means having electrically conducting foil ends external to said container, said foil ends being designed to make electrical contact with the terminals of an electrical energy source when said container is in a closed position, each of said electrically conducting foil means being affixed to one of said internal axially polar surfaces, said electrical conducting foil means being in fixed intimate electrical contact with each of the axially polar external surfaces of said two axially polar high conducting solid food portions when said container is in a closed position, the ratio of the surface area of foil-contacted high conducting food portion to surface area of non-contacted high conducting food portion being from 1:8 up to 1:4, whereby during the cooking process, the excess heat generated by the passage of electrical current through the solid electrically high conducting food is dissipated into and substantially retained within the electrically low conducting food.

2. The packaged unit of food of claim 1 wherein the electrically high conducting food is also thermally high conducting.

3. The single packaged unit of food of claim 1 wherein the electrically high conducting food has a resistivity in the range of from 1 up to 10 ohm-inches over a range of temperature of from 30° up to 250°F.

4. The single packaged unit of food of claim 1 wherein said electrically conducting means comprises: (i) a foil section extending outwardly from said container, said foil section being in intimate electrical contact with the external surfaces of said two axially polar high conducting food portions when said container is in a closed position; and (ii) attached to and making electrical contact with said foil, and extending inwardly into said high conducting food without puncturing same, and extending outwardly from said foil section portion which is in intimate electrical contact with the external surfaces of said two axially polar high conducting food portions when said container is in a closed position, a protruding electrical conducting means.

5. The single packaged unit of food of claim 4 wherein said protruding electrical conducting means indent said high conducting food to a depth of from 0.3 up to 0.4 inches.

6. A single packaged unit of food of claim 1 wherein the low conducting food is a baked dough.

7. The single packaged unit of food of claim 6 wherein the high conducting food is a sausage.

8. The single packaged unit of food of claim 7 wherein the sausage is a frankfurter.

* * * * *